(12) United States Patent
Kniss (10) Patent No.: US 7,798,546 B2
(45) Date of Patent: Sep. 21, 2010

(54) MATERIAL HANDLING DEVICE WITH LEVEL INDICATOR

(75) Inventor: Jason M Kniss, Garden City, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 849 days.

(21) Appl. No.: 11/595,266

(22) Filed: Nov. 9, 2006

(65) Prior Publication Data

US 2008/0111388 A1    May 15, 2008

(51) Int. Cl.
B25J 15/06     (2006.01)
B66C 1/02     (2006.01)

(52) U.S. Cl. ........................................................ 294/65
(58) Field of Classification Search ................ 294/64.1, 294/65; 271/91, 103; 414/752.1
See application file for complete search history.

(56) References Cited

U.S. PATENT DOCUMENTS

| | | | |
|---|---|---|---|
| 1,228,690 A | 6/1917 | Monnet | |
| 2,389,480 A | 11/1945 | Baker | |
| 2,689,412 A | 9/1954 | Young | |
| 2,824,381 A | 2/1958 | Traupmann | |
| 2,850,279 A | 9/1958 | Stoothoff et al. | |
| 3,223,442 A | 12/1965 | Fawdry et al. | |
| 3,456,941 A | 7/1969 | Beskow | |
| 3,673,759 A | 7/1972 | Ayres et al. | |
| 4,129,328 A | 12/1978 | Littell | |
| 4,266,905 A | 5/1981 | Birk et al. | |
| 4,600,228 A | 7/1986 | Tarbuck | |
| 4,662,668 A | 5/1987 | Hufford | |
| 4,747,634 A | 5/1988 | Hoke | |
| 4,957,318 A | 9/1990 | Blatt | |
| 5,025,568 A | 6/1991 | Grimes | |
| 5,029,383 A | 7/1991 | Snyder et al. | |
| 5,051,044 A | 9/1991 | Allen | |
| 5,172,922 A | 12/1992 | Kowaleski et al. | |
| 5,203,871 A | 4/1993 | Seo | |
| 5,251,919 A | 10/1993 | Summers | |
| 5,352,086 A | 10/1994 | Mank | |
| 5,402,579 A | 4/1995 | Smith | |
| 5,609,377 A | 3/1997 | Tanaka | |
| 5,622,362 A | 4/1997 | Shiiki et al. | |
| 5,676,364 A | 10/1997 | Shiiki et al. | |
| 6,345,818 B1 | 2/2002 | Stephan et al. | |
| 6,416,274 B2 | 7/2002 | Tokuno | |
| 6,454,333 B2 | 9/2002 | Portal | |
| 6,502,877 B2 | 1/2003 | Schick et al. | |
| 6,863,323 B2 | 3/2005 | Neveu | |
| 7,029,046 B2 | 4/2006 | Lim | |
| 7,281,739 B2 | 10/2007 | Kniss | |

*Primary Examiner*—Paul T Chin
(74) *Attorney, Agent, or Firm*—Harness, Dickey & Pierce, P.L.C.

(57) ABSTRACT

A material handling system includes a support assembly, a cup assembly comprising a cup and a mounting assembly. The mounting assembly includes a post extending from the cup, and a mounting collar movably attached to the post and adjustably attached to a support arm of the support assembly. The mounting assembly may include a level indicating element for indicating an orientation of the mounting assembly. The mounting collar is adjustable relative to the support arm to establish a first or level orientation of the mounting assembly. The level indicating element provides an indication when the mounting assembly is generally at the first or level orientation, and the mounting collar is securable relative to the support arm when the mounting assembly is in the first or level orientation.

19 Claims, 8 Drawing Sheets

MATERIAL HANDLING DEVICE WITH LEVEL INDICATOR

FIELD OF THE INVENTION

The present invention relates generally to material handling systems and, more particularly, to material handling systems that handle objects via vacuum cups or suction cups that engage a surface or surfaces of an object and that are substantially sealed thereto.

BACKGROUND OF THE INVENTION

It is known to provide a material handling system that includes vacuum cups that are adapted to be moved into engagement with an object, such as a substantially flat object or panel or the like, and that lift and move the object to a desired location via a movable support structure. Such vacuum cups or suction cups may be moved into engagement with the object, and a vacuum source may be actuated to create a vacuum between the object and the cup such that the object is retained to the cup as it is transported to the targeted area. An example of such a vacuum cup is disclosed in U.S. Pat. No. 4,662,668, which is hereby incorporated herein by reference. The vacuum cup may include a proximity sensor that determines when the cup has engaged an object and that the object is positioned adjacent to the end of the proximity sensor.

It has been proposed to move the vacuum cups relative to the objects by providing a linear actuator or cylinder at each vacuum cup, such as disclosed in U.S. Pat. No. 4,129,328 issued to Littell. The cylinder may extend and retract to individually move the respective vacuum cup into engagement with the surface of the object. Although such a system may accommodate variations in the surface of the object, the system may include control circuitry and multiple actuators, which may add significantly to the cost and complexity of the system. Also, it is often difficult to properly align or orient the vacuum cups so that the linear actuator or other mounting element is substantially vertically oriented for substantially vertical movement by the support system.

Therefore, there is a need in the art for a material handling system that engages and picks up and moves objects and that overcomes the shortcomings of the prior art.

SUMMARY OF THE INVENTION

The present invention provides a material handling system that is operable to move two or more devices or vacuum cups into engagement with an object and to pick up and move the object to a targeted or desired location. The devices may include a level indicator established at or along a mounting element or post or collar so that an operator may readily adjust or set the post to a substantially vertical orientation (or otherwise oriented so that the post is generally parallel to the direction of movement of the support assembly or system) so that the cups are at a desired or appropriate initial orientation as they are moved toward and into engagement with the object.

According to an aspect of the present invention, a material handling system includes a support assembly and a material handling device or cup assembly for engaging and moving an object. The material handling device includes a cup (such as a vacuum cup or suction cup) and a mounting assembly or element for mounting the cup to the support assembly. The mounting element includes a level indicating element or device that is configured to indicate an orientation of the mounting element, such as an orientation relative to a level or horizontal plane. The mounting element may be adjustably mounted to the support assembly and may be adjustable to adjust the orientation of the cup relative to the support assembly in response to an indication by the level indicating element.

Optionally, the mounting element may include a post that extends upward from the cup and a mounting collar that is movably positioned at the post. Optionally, the post may be attached to and extend upward from a receiving collar that receives a swivel member of the cup, such that the cup is pivotally attached at a lower end of the post. The mounting collar is adjusted relative to the support assembly to adjust an angle of the post relative to the support assembly.

Optionally, the mounting collar may be reversibly mounted or adjustably attached to the post. The mounting collar may be attached to the post at a first orientation for positioning the cup at a first initial level relative to the support assembly, and may be reversed or adjusted to attach to the post at a second orientation for positioning the cup at a second initial level relative to the support assembly. Thus, a support arm or rod may be received through a mounting portion of mounting collar at different levels relative to the cup via adjustment of the mounting collar. Multiple vacuum cup assemblies thus may be mounted to support arms or rods that are vertically offset from one another (such as when two such support arms are generally perpendicular to one another with one arm above the other), whereby the offset between the support arms is countered by the adjustment in the height of the vacuum cup when the mounting collar is reversed or flipped over to the other orientation, such that the vacuum cup assemblies are mountable to the offset support arms with the vacuum cups at generally the same level when in their initial position for being moved toward and into engagement with an object surface.

Movement of the support assembly thus moves the cup toward and into engagement with an object. The support assembly may comprise at least one rod or support element, with the mounting collar being movably attached to the support element. The mounting collar may be pivoted or rotated or adjusted about the longitudinal axis of the support element or rod to set the post of the material handling device at a substantially vertical orientation via an operator viewing the level indicating element and adjusting the mounting collar relative to the rod until the level indicating element indicates a substantially level orientation of the indicating element.

According to another aspect of the present invention, a method of engaging and moving an object includes providing a support assembly having at least one movable support arm and providing at least one cup assembly comprising a cup having a perimeter seal for engaging and substantially sealing against an object surface. The cup assembly comprises a mounting assembly or element that includes a post attached to the cup and a mounting collar movably attached to the post (so as to be slidable or otherwise movable longitudinally along the post). The mounting assembly has a level indicating element for indicating an orientation of the mounting collar and/or post, such as orientation relative to a horizontal plane. The mounting collar is attached to the movable support arm, and is adjusted relative to the movable support arm until the level indicating device provides an indication that the mounting assembly is substantially at a first orientation. The mounting collar is secured relative to the support arm when the mounting assembly is at the first orientation. The support assembly is moved to move the cup assembly until the cup engages the object and is then moved to lift the object and to move the object to a targeted location while the object is held by the cup.

The support assembly may be moved in a direction generally parallel to a longitudinal axis of the post when the mounting assembly is at the first orientation to move the mounting collar along the post after the cup engages the object. The mounting collar may be substantially level and the post may be substantially vertical when the mounting assembly is in the first orientation, whereby generally vertical movement by the support arm moves the mounting collar along the substantially vertical post with reduced or limited binding of the mounting collar at the post.

According to another aspect of the present invention, a material handling system for moving an object includes a support assembly having a first support arm at a first level and a second support arm at a second level, with the second level being above the first level. A first cup assembly is mounted to the first support arm and a second cup assembly is mounted to the second support arm. The first and second cup assemblies each comprising a cup and a mounting assembly, with the cup having a perimeter seal for engaging and substantially sealing at an object. The mounting assembly comprising a post extending from the cup and a mounting collar movably attached to the post. The mounting collar of the first cup assembly is set at a first orientation and the mounting collar of the second cup assembly is set at a second orientation wherein the mounting collar of the second cup assembly is rotated approximately 180 degrees about a generally horizontal pivot axis relative to the mounting collar of the first cup assembly. The mounting collar of the first cup assembly is attached to the first support arm and the mounting collar of the second cup assembly is attached to the second support arm. The vacuum cups of the first and second cup assemblies are at substantially the same level when the first and second cup assemblies are mounted to the first and second support arms, respectively. The mounting collars are attached to the first and second support arms such that movement of the support assembly moves the cups of the first and second cup assemblies toward and into engagement with the object.

Therefore, the present invention provides a material handling system that moves one or more material handling devices and vacuum or suction cups into engagement with an object. The level indicating device or element provides an indication when the mounting element or collar is substantially level and/or when the post is substantially vertically oriented. The support arm is movable generally vertically and thus substantially along the longitudinal axis of the vertically oriented post so that reduced binding of the mounting collar at the post may occur, and/or reduced damage to the mounting assembly may occur, as the mounting collar is moved along the post. The present invention thus provides an enhanced means for setting the mounting collar and post at the desired or appropriate orientation for enhanced or optimal movement of the support arms during engagement of the cups with the object.

These and other objects, advantages, purposes and features of the present invention will become apparent upon review of the following specification in conjunction with the drawings.

DESCRIPTION OF THE PREFERRED EMBODIMENTS

Figure 1:
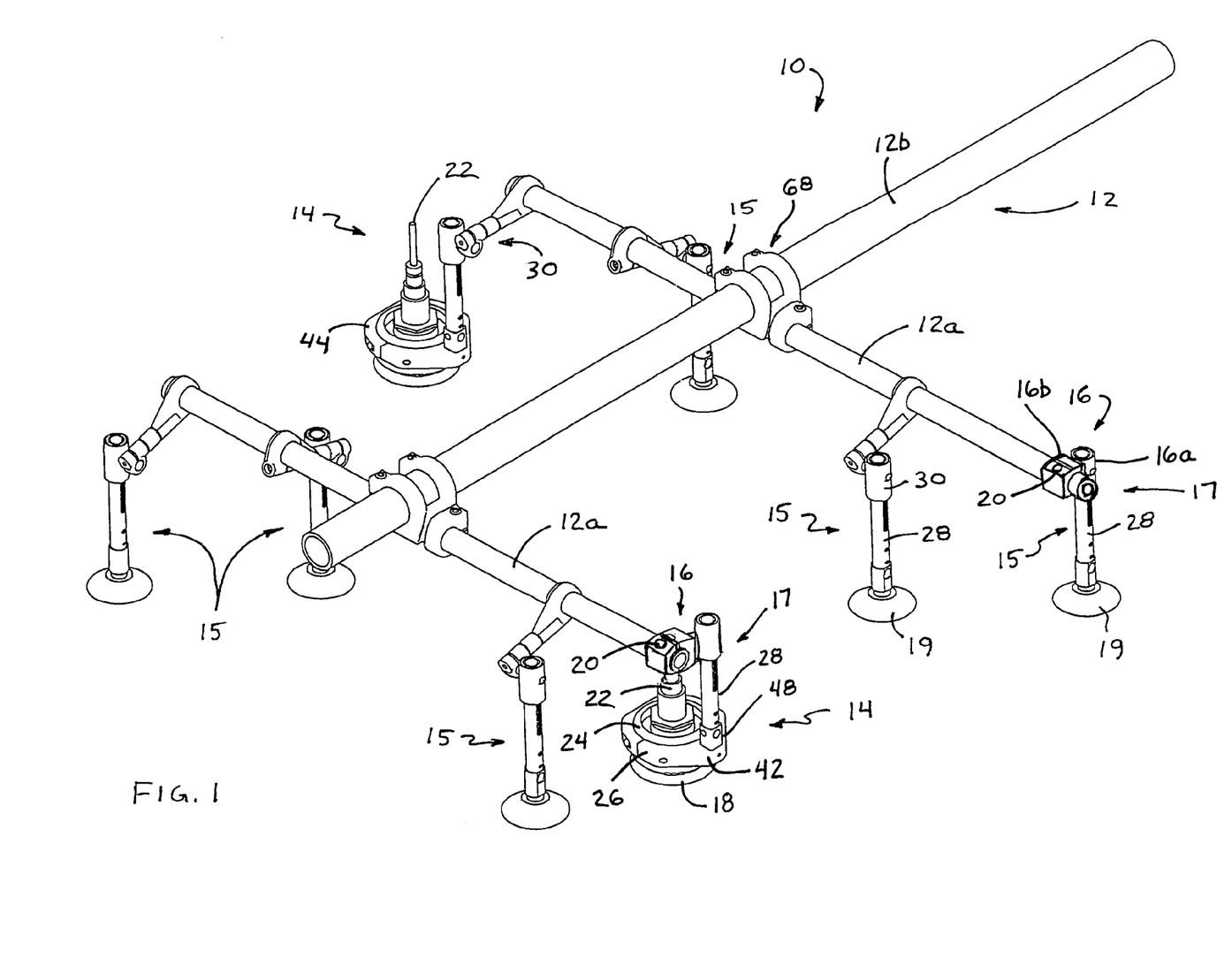
FIG. 1 is a perspective view of a material handling system in accordance with the present invention.

Referring now to the drawings and the illustrative embodiments depicted therein, a material handling system 10 includes a support assembly 12 that is operable to move and support a plurality of vacuum cup assemblies or material handling devices or assemblies or destackers 14, 15 (FIG. 1). Support assembly 12 is movable or adjustable or controllable to move the material handling devices 14, 15 into engagement with an object (not shown), where the cups 18, 19 (such as vacuum cups or suction cups or the like) of material handling devices 14, 15 may engage and seal to the object for picking up and moving the object. Material handling system 10 may include a vacuum source (not shown) for providing a vacuum at each of the vacuum cups 18 to substantially vacuum seal the vacuum cups 18 to the object. At least some (and optionally all) of the material handling devices 14, 15 include mounting assemblies or elements 17 that mount the cups to the support assembly 12 and that include a level indicating device or element 20 established thereon and integral therewith. In the illustrated embodiment, mounting assembly 17 includes a mounting collar 16, which is adjustably mounted to the support assembly 12 and is adjustable to set or establish the orientation of the material handling devices 14, 15 relative to the support assembly in response to an indication provided by the level indicating element 20, as discussed below.

In the illustrated embodiments, the material handling devices 14 provide adjustable mounts that allow the respective vacuum cups 18 to be independently pivoted and moved into engagement with an angled surface of the object via movement of the support assembly 12, as discussed below. The mounting assemblies 17 of material handling devices 14, 15 include mounting or support posts 28 that allow for movement of the mounting collars 16 during engagement of the cups 18, 19 with the object, as discussed below. The material handling devices 14, 15 may utilize similar aspects as material handling devices of the types described in U.S. patent application Ser. No. 10/931,637, filed Sep. 1, 2004 by Kniss for ADJUSTABLE MOUNT FOR VACUUM CUP, which is hereby incorporated herein by reference in its entirety.

In the illustrated embodiment, mounting assembly 17 of material handling device 14 includes a post or mount 28 extending generally vertically upward from the cup and/or from a receiving collar 26 (when receiving collar 26 is generally horizontal). The mounting collar or member or element or movable or slidable collar or member or element 16 may be movable or slidable along post 28 and may attach or mount the material handling device 14 to a movable support arm 12a of support assembly 12. The level indicating element 20 indicates a level or orientation of the mounting collar 16 and/or of the post so that the mounting collar 16 and post 28 may be selectively oriented to a desired or appropriate orientation in response to an indication by the level indicating element. For example, the support arms 12a may be substantially horizontally oriented and may be substantially vertically movable to engage the cups with the object. Thus, the mounting collar 16 may be adjusted relative to the support arms 12a until the level indicating element or elements 20 indicate that the mounting collar 16 (or a portion of the mounting collar or level indicating device) is substantially horizontally oriented, whereby the post 28 is substantially vertically oriented. Thus, the post 28 is oriented so as to be substantially aligned with the direction of movement of the support arms 12a as they are moved toward the object to engage the vacuum cups with the object. The mounting collar 16 thus is slidable or movable along the post and will encounter reduced binding as the mounting collar moves along the post due to the alignment of the post with the direction of movement of the support arm 12a and mounting collar 16, as discussed in greater detail below.

As best shown in FIG. 1, each material handling device 14 may include a vacuum cup 18 and an object sensor 22 mounted to a swivel member or ring 24. The material handling device 14 may be a pivotable cup assembly or material handling device whereby the swivel member 24 is pivotally received within a respective receiving collar or ring 26, such as described in U.S. patent application Ser. No. 10/931,637, filed Sep. 1, 2004 by Kniss for ADJUSTABLE MOUNT FOR VACUUM CUP, which is hereby incorporated herein by reference in its entirety. The vacuum cup and object sensor and swivel member thus may pivot relative to the receiving collar (such as about a plurality of generally horizontal pivot axes) to align the vacuum cup 18 with a generally non-horizontal or angled surface of an object, while the receiving collar 26 may be held generally horizontal by the support assembly 12.

Optionally, other types of mounting collars or brackets or arms 30 (FIG. 1) may be implemented on some of the material handling devices to mount the material handling devices to the respective support arms 12a. Support arms 12a may attach to and move multiple mounting assemblies and material handling devices 14, 15 into engagement with the object to be picked up and moved by the material handling system. The mounting collars 16, 30 may move or slide along the respective generally vertical posts 28 after the respective vacuum cup is engaged with the object and while the support arm is moved further downward to move the other vacuum cup or cups into engagement with the object, such as described in U.S. patent application Ser. No. 10/931,637, filed Sep. 1, 2004 by Kniss for ADJUSTABLE MOUNT FOR VACUUM CUP, which is hereby incorporated herein by reference in its entirety. At least some of the mounting assemblies include a level indicating device or element or an angle indicating device or element for indicating the orientation of the mounting assembly.

Figure 2:
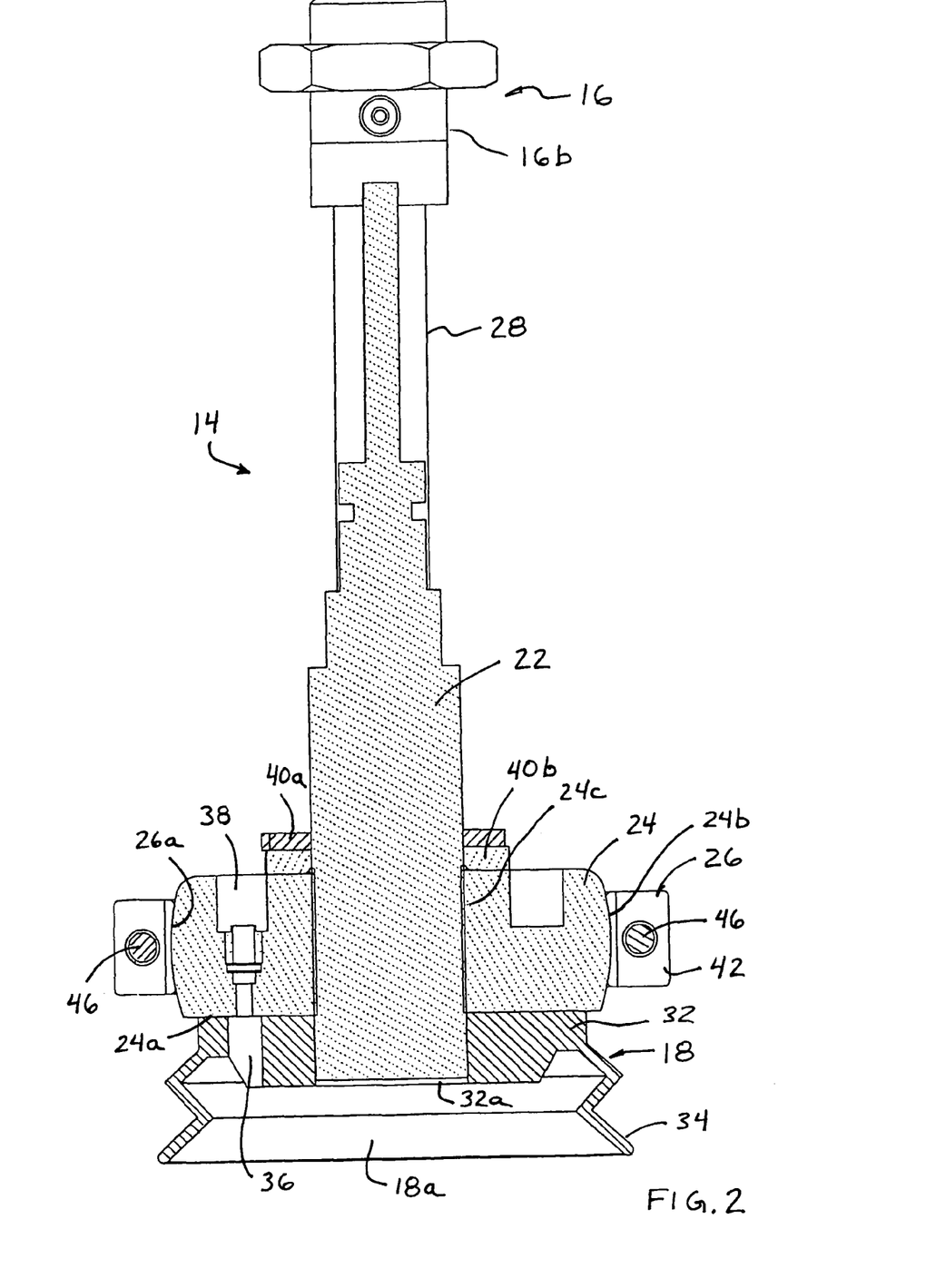
FIG. 2 is a partial sectional view of a material handling device of the present invention.

As shown in FIGS. 1 and 2, vacuum cup 18 of material handling device 14 may include a body portion 32 and a perimeter seal portion 34. Vacuum cup 18 may include a vacuum port 36 which provides a passageway for drawing air out of a cavity 18a defined by the body portion 32 and perimeter seal 34 and the surface of the object that is engaged with an engaging end 34a of the perimeter seal 34. Vacuum cup 18 may be connected to and/or in fluid communication with the vacuum source, such as via a tube or hose or the like (not shown) connecting to the vacuum port 36. The vacuum source may be operable to draw air from cavity 18a through vacuum port 36 to at least partially evacuate the air from the cavity and create a partial or substantial vacuum in cavity 18a, so as to substantially seal and retain the object to vacuum cup 18. Material handling device 10 and vacuum cup 18 may utilize aspects of the vacuum devices described in U.S. patent application Ser. No. 11/430,712, filed May 9, 2006 by Perlman et al. for AUTO-RELEASE VACUUM DEVICE, which is hereby incorporated herein by reference in its entirety.

Vacuum cup 18 may be integrally or unitarily molded from an elastomeric material or may be otherwise formed or molded, without affecting the scope of the present invention.

Although shown as a vacuum cup having a bellows style or accordion style perimeter seal 34, it is envisioned that the vacuum cup may have other seal portions (such as a tapered perimeter seal portion or the like, and/or such as a seal portion of the types described in U.S. patent application Ser. No. 11/034,046, filed Jan. 12, 2005 by Perlman et al. for VACUUM CUP, which is hereby incorporated herein by reference in its entirety), and/or other types of vacuum cups may be implemented with the material handling device, without affecting the scope of the present invention.

Vacuum cup 18 may be attached to or adhered to or molded to or fastened to or otherwise secured to a lower surface or portion 24a of swivel member 24. As shown in FIG. 2, swivel member 24 may include a vacuum port 38, such that the vacuum hose or tube or the like may connect thereto, whereby actuation of the vacuum source will draw air out of the cavity of the vacuum cup and through the vacuum ports 36, 38. As can be seen in FIGS. 1 and 2, swivel member 24 may comprise a generally disc-shaped member having an outer surface 24b that is generally a partial spherical shape to facilitate pivotal movement of swivel member 24 relative to receiving collar 26, as discussed below.

Optionally, body portion 32 of vacuum cup 18 of material handling device 14 may have an aperture 32a therethrough, while swivel member 24 may also have a generally corresponding aperture 24c therethrough, for receiving object sensor 22. Object sensor 22 thus may be positioned through a generally central region of swivel member 24 and may be partially within vacuum cup 18 and directed generally toward the engaging end 34a of perimeter seal 34 of vacuum cup 18. The object sensor may be inserted a desired amount or distance into body portion 32 and may be retained in the desired or appropriate position via a fastener or nut 40a and washer 40b. Optionally, the object sensor 22 may comprise a double blank detector or sensor that is operable to detect the thickness of the material of the object at the vacuum cup to ensure that only one object or panel is picked up by the vacuum cup, such as described in described in U.S. patent application Ser. No. 10/931,637, filed Sep. 1, 2004 by Kniss for ADJUSTABLE MOUNT FOR VACUUM CUP, which is hereby incorporated herein by reference in its entirety, or may comprise a proximity sensor that is operable to detect the presence of an object or item at the vacuum cup, in order to determine if the vacuum cup is fully engaged with the object and if the object is properly retained by the vacuum cups as the system moves the devices 14, 15 to lift and move the object. The object or proximity sensor may comprise any suitable type of sensing device, and may comprise a sensing device of the type described in U.S. Pat. No. 4,662,668, which is hereby incorporated herein by reference.

Receiving collar 26 may comprise curved or semi-circular opposite collar portions 42, 44, which may be joined together to form the generally circular receiving collar 26. Each of the collar portions 42, 44 is substantially a semi-circle and defines a respective semi-circular inner curved surface 26a (FIG. 2) that is formed in a partial spherical shape to correspond to the shape of the outer surface 24b of the swivel member 24. The collar portions 42, 44 may be assembled together around the swivel member to pivotally secure the swivel member 24 within the receiving collar 26, such as via threaded fasteners or bolts 46 threaded through respective apertures in the collar portions 42, 44 to secure the portions together around the swivel member 24. Other means for securing or retaining the collar around the swivel member may be implemented, without affecting the scope of the present invention.

Receiving collar 26 thus may pivotally receive swivel member 24 therein, such that swivel member 24 may pivot relative to receiving collar 26 to adjust an angle or tilt of the vacuum cup for engagement with the object surface, as discussed below. The swivel member and the receiving collar have correspondingly formed partial spherical surfaces, such that the opposing surfaces allow pivotal movement of the swivel member (and vacuum cup and object sensor) relative to the receiving collar and about a plurality of generally horizontal pivot axes. In other words, the swivel member may be pivoted about any axis defined generally by a diametrical line through the swivel member, similar to a ball and socket type of mounting arrangement.

Support post 28 may be attached to one collar portion 42 of receiving collar 26 (or may attach to a body portion of a vacuum or suction cup), such as via an attachment element 48. In the illustrated embodiment, attachment element 48 attaches to or receives a lower end 28a of post 28 at an upper end or portion of attachment element 48. Attachment element 48 includes a threaded lower end or portion 48a for threadedly attaching to receiving collar 26 to secure post 28 to receiving collar 26 (or to cup 19). Attachment element 48 thus is securable to the collar 26 such that post 28 extends generally vertically upwardly from receiving collar 26 when receiving collar 26 is generally horizontal (in other words, post 28 is generally perpendicular or normal to a plane of the receiving collar 26 and is generally parallel to an axis through the aperture of the receiving collar). Optionally, the post 28 may attach to the cup 19 (such as shown in FIG. 1) or to any suitable structure or body portion at the vacuum or suction cup so that the post extends upward or generally vertically upward from the cup.

Although shown and described as a threaded attachment between the post and receiving collar, other attachment means may be implemented without affecting the scope of the present invention. For example, the post may be received into a slot or aperture in the receiving collar and may be clamped or substantially locked or otherwise retained within the slot or aperture. For example, the post may include a slot or groove at least partially around a lower end thereof, and the lower end may be received into a slot or aperture formed or established at the mounting collar, whereby the post may be substantially clamped when received in the slot or aperture to substantially retain the post therein to attach or mount the receiving collar to the post.

Support post 28 may comprise a generally cylindrical, hollow tube that is received within and through a post mounting portion 16a of mounting collar 16. In an illustrated embodiment, post 28 attaches to receiving collar 26, which pivotally receives the vacuum cup therein. However, post 28 may alternately mount directly to a vacuum cup or vacuum cup body (such as shown in FIG. 1 with cups 19 of cup assemblies 15) while remaining within the spirit and scope of the present invention.

Figure 3:
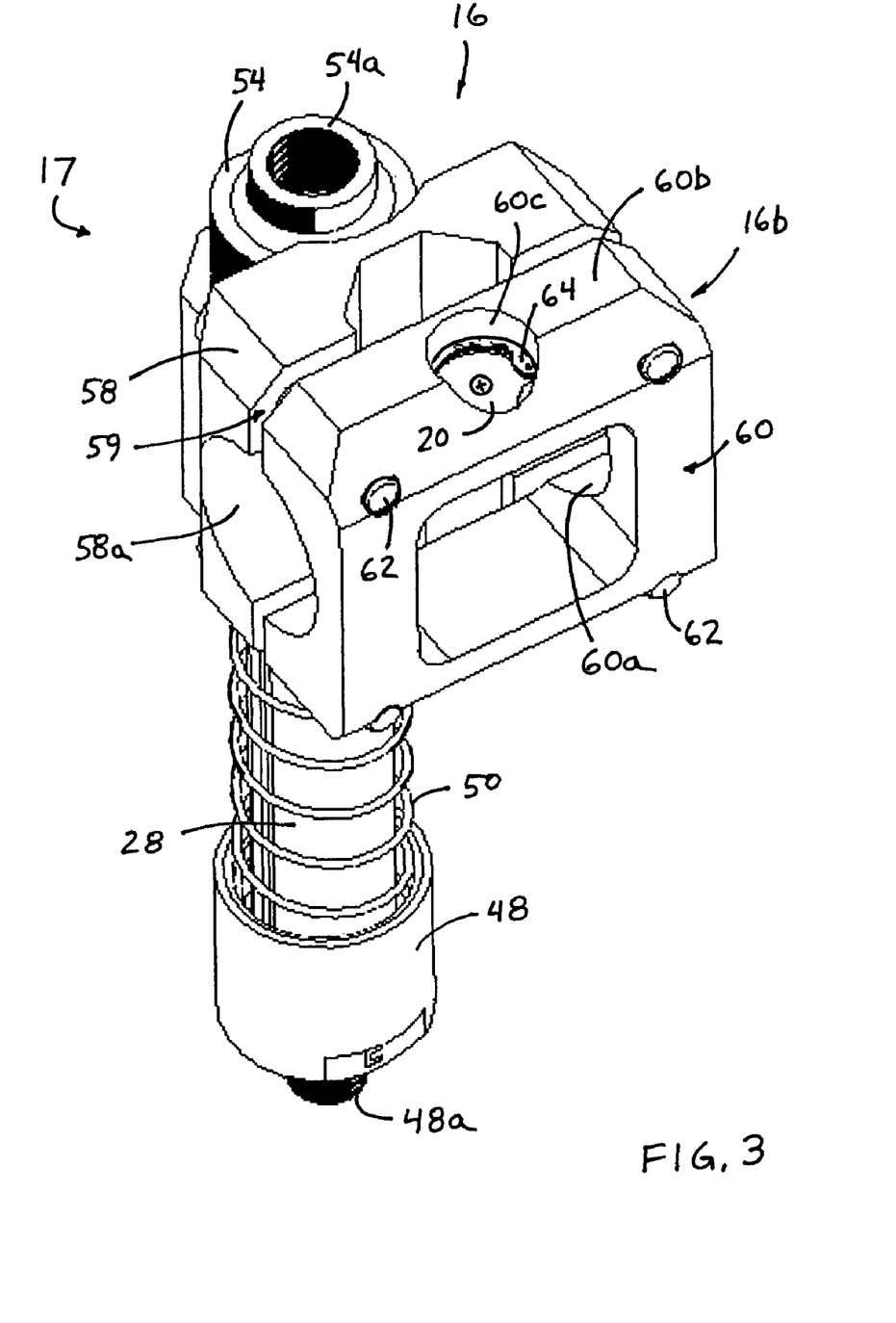
FIG. 3 is a perspective view of a material handling device of the present invention.

As can be seen in FIGS. 3-6, the mounting assembly 17 may include a biasing member or spring 50 along (or optionally within) the post or tube 28 to bias or urge the mounting collar 16 along post 28 and away from receiving collar 26 and/or cup 18, 19. In the illustrated embodiment, post mounting portion 16a of mounting collar 16 may include a spring engaging element or lip 52 that engages an upper end of the biasing member or spring 50, such that spring 50 urges mounting collar 16 along post 28 and upward and/or away from receiving collar 26 and/or cup 18, 19. Further, and as shown in FIG. 3, an opposite or lower end of spring 50 may engage or may be received in or at attachment element 48 (or may engage a lip or stop element at or on or in post 28 or at collar 26 or at attachment element 48 to limit downward movement of spring 50 while remaining within the spirit and scope of the present invention).

Figure 4:
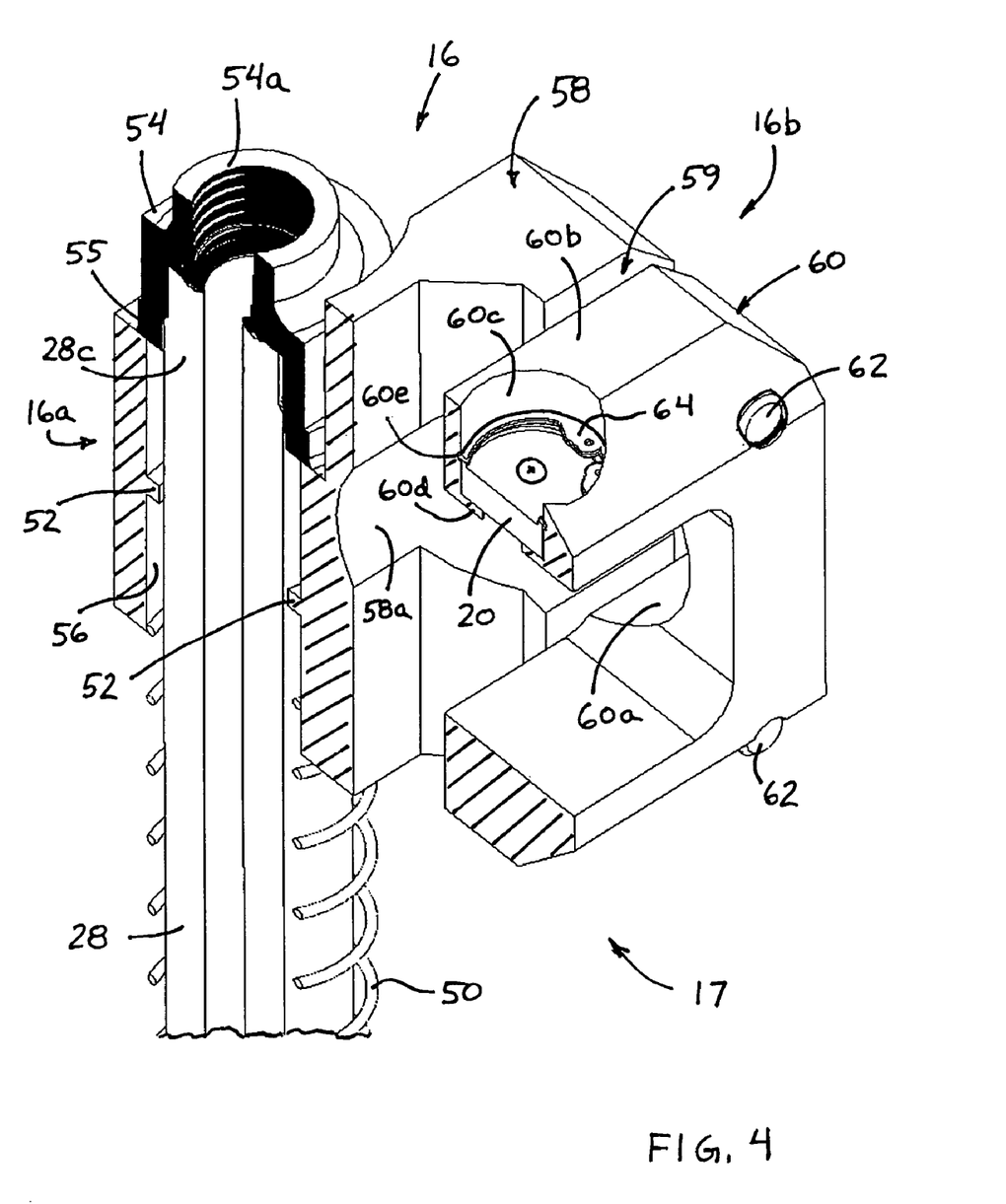
FIG. 4 is a perspective sectional view of the material handling device of FIG. 3.

Mounting assembly 17 of material handling device 14, 15 includes a stop collar 54 and a stop member 55 (such as an elastomeric member or urethane or rubber member or the like), which may be attached at the upper end of the support post 28 to limit upward movement of the mounting collar 16 along support post 28. Optionally, and as shown in FIGS. 3 and 4, stop collar 54 may provide a threaded opening or passageway 54a, such as for attachment to another element or structure of the material handling system, such as other types of mounting brackets or a vacuum source or the like (whereby post 28 may provide a conduit between the vacuum source and the vacuum cup, such as may be suitable in applications where the lower end of post 28 connects to a vacuum cup body and not to a separate receiving collar).

Optionally, attachment element 48 (and/or stop collar 54) may be selected depending on the desired diameter and thread pitch for use in or with a selected or appropriate receiving collar 26 (or cup or other device or element to which the post is to be attached). The attachment element may be readily attached at the lower end of the post (such as via threaded engagement or press fit or frictionally retained or the like) and may be removed and replaced with a different attachment element if desired or appropriate. For example, an attachment element with a metric thread configuration may be selected for some metric applications, while an attachment element with a U.S. or imperial thread configuration may be selected for other applications with a correspondingly threaded receiving collar or cup. Similarly, the upper stop collar 54 may be selected to provide different thread configurations for different applications. The mounting assemblies thus may be readily adapted for different applications via selection and attachment of different attachment elements at the lower end of the post and different stop collars at the upper end of the post.

Mounting collars 16 (and optionally mounting collars 30) are configured to mount to or secure to or attach to a portion of the support arm or arms 12a of support assembly 12, such as via any suitable attachment means or the like. When mounting collars 16, 30 are attached to the support assembly 12, such as to the support arms 12a of support assembly 12, movement of the support assembly correspondingly moves the mounting collars 16, 30 and, thus, the respective material handling devices 14, 15. The biasing member or spring 50 urges the mounting collars 16, 30 toward the upper ends 28c of the respective posts 28 such that mounting collars 16, 30 remain generally at the upper end of the post during movement of the support assembly and material handling device toward an object. Support assembly 12 moves to move the vacuum cups toward and into engagement with an object. As the vacuum cups are pressed against the object, further movement of support assembly 12 toward the object causes the mounting collars 16 to move along posts 28, and with reduced or limited binding of mounting collars 16 at posts 28, due to alignment of the post 28 with the direction of movement of the support assembly 12 during the engagement process, as discussed below.

In the illustrated embodiment, mounting collar 16 of mounting assembly 17 includes a post mounting portion 16a that movably attaches to post 28 and a support mounting portion 16b for adjustably mounting or attaching to a support arm 12a. Post mounting portion 16a comprises a collar portion having a generally cylindrical passageway 56 formed therethrough for receiving post 28 therein. As shown in FIG. 4, spring engaging lip 52 extends radially inward from the generally cylindrical surface of passageway 56 of post mounting portion 16a for engaging spring 50 at post 28. Post mounting portion 16a thus may receive an upper end of post 28 through passageway 56, whereby stop member 55 and stop collar 54 may be positioned at and/or attached at the upper end of post 28 to limit upward movement of post mounting portion 16a and thus to limit or substantially preclude dislodgement or disconnection of post mounting portion 16a from post 28. In the illustrated embodiment, post mounting portion 16a is integrally or unitarily formed with a portion of support mounting portion 16b, but may be otherwise formed and connected or attached to the support mounting portion 16b, while remaining within the spirit and scope of the present invention.

As shown in FIGS. 3 and 4, support mounting portion 16b of mounting collar 16 comprises a split collar for receiving a support arm 12a therein. Support mounting portion 16b thus includes a first collar portion 58 and a second collar portion 60 that are attachable to one another to secure support arm 12a therebetween. In the illustrated embodiment, first collar portion 58 is integrally or unitarily formed with post mounting portion 16a and provides a curved surface 58a (which defines a portion of a cylindrical passageway 57) along the side or region of first collar portion 58 that is generally opposite from the post mounting portion 16a. Second collar portion 60 likewise provides a curved surface 60a (which defines another portion of the cylindrical passageway 57) that generally opposes the curved surface 58a when second collar portion 60 is attached to first collar portion 58. In the illustrated embodiment, the first and second collar portions 58, 60 are secured together via a plurality of fasteners 62, which may be inserted through non-threaded passageways in one of the collar portions and threaded into threaded passageways in the other of the collar portions to substantially secure the collar portions together.

Thus, the collar portions may be assembled together around a support arm and the fasteners may be tightened to substantially clamp and retain support arm 12a at and within and between the collar portions when the support mounting portion 16b is at the desired or appropriate or level orientation, as discussed below. The partial cylindrical or curved surfaces 58a, 60a are sized so that a gap 59 exists between the opposed faces of the collar portions 58, 60 when the support arm 12a is received within the passageway 57 defined by the partial cylindrical surfaces 58a, 60a. Thus, tightening of the fasteners 62 substantially clamps the support arm 12a between and within the partial cylindrical surfaces 58a, 60a of collar portions 58, 60. The collar portion 58 and post mounting portion 16a are configured so that the passageway 56 formed through post mounting portion 16a (for receiving post 28) is substantially perpendicular to or normal to the longitudinal axis of the passageway 57 defined by the curved surfaces 58a, 60a of the assembled collar portions 58, 60.

In the illustrated embodiment, and as best shown in FIGS. 3 and 4, level indicating element 20 is located at an upper surface or region 60b of second collar portion 60. In the illustrated embodiment, level indicating element 20 is located or embedded within a recess or cavity 60c formed at least partially through upper region 60b of collar portion 60, and may be retained therein. For example, cavity 60c may be formed partially through upper region 60b and may allow for insertion of level indicating element 20 until level indicating element rests at a lower or bottom portion 60d of cavity 60c. The bottom portion 60d of the cavity 60c is configured so that it is generally parallel to a longitudinal axis of the support arm 12a that is received in the support mounting portion 16b of the mounting collar. A groove or channel 60e may be formed along the surface of cavity 60c and may receive a spring clip 64 or the like, which may be received in the channel 60e after level indicating element 20 is set into the cavity 60c to substantially retain level indicating element 20 in cavity 60c.

In the illustrated embodiment, level indicating element 20 comprises a bubble indicator or "bull's-eye" indicator or level that indicates the degree of levelness of the indicating element via an air bubble that moves through fluid contained within the indicating element, such as is known in the field of levels or level indicators. For example, level indicating element 20 may include a curved upper cover that has markings or indications at a central region of the upper cover, whereby the air bubble will be located substantially at the center of the curved upper cover when the level indicating element is substantially horizontally oriented. Thus, tilting of the indicating element to one side or the other will be indicated by the location of the bubble being off of the center of the indicating element.

The support mounting portion 16b may be pivoted or rotated about the longitudinal axis of the support arm 12a and the fasteners 62 may be tightened to secure the support mounting portion 16b to the support arm 12a when the bubble indicator is substantially at the center region of the indicating element 20. Thus, the support mounting portion 16b may be mounted to a substantially horizontally oriented support arm 12a and may be adjusted so that the level indicating element 20 is substantially horizontally oriented (in response to a user viewing the indicating element as the support mounting portion is pivoted about the support arm), and then may be secured at the desired or level orientation via tightening of the fasteners 62. When the mounting collar 16 is positioned and secured so that the level indicating element indicates that the level indicating device is substantially level or parallel to a horizontal plane, the post 28 is substantially vertically oriented and is generally normal to the longitudinal axis of the support arm 12a, whereby the post is generally aligned with the substantially vertically downward directional movement of the support arm 12a.

It is further envisioned that the level indicating device or element 20 may be used to assist in leveling the orientation of the support arm 12a via adjustment of the support arm 12a relative to a main or primary support 12b (FIG. 1) and clamping or tightening or securing of the support arm 12a at the desired or appropriate or level orientation via tightening of a clamping bracket 68 around the main support 12b. For example, the support arm 12a may be pivoted or adjusted relative to main support 12b until the level indicating element indicates that the support arm 12a is substantially level, whereby the bracket or collar 68 may be tightened to secure support arm 12a relative to main support 12b at the desired or appropriate orientation.

During use, the movable support arm or arms may connect to the mounting collars of multiple material handling devices or assemblies 14, 15, and may move the multiple devices downward into engagement with different areas of the object to be picked up and moved by the material handling system. Because the object may not be horizontal or level, and may be at varying angles depending on how many objects are in the stack of objects, the support arm may move downward until a vacuum cup of a first one of the devices engages a respective area of the object (and may pivot to generally uniformly engage the surface of the object at the respective area). Further movement of the support arm toward the object causes the vacuum cups of at least some of the other devices to be moved into engagement with other areas of the object, while the mounting collar of the first device may move or slide downward along the support post against the biasing member and toward the respective vacuum or suction cup. The mounting collar thus may move or slide along the vertical support post and compress the spring of the vertical post (such as an internal spring within the post or an external spring around the post or other biasing member or members otherwise arranged at and/or along the post) as the support assembly moves or lowers the other cups into engagement with the object.

Because the orientation of the post 28 is substantially vertically oriented via adjustment of the mounting collar and the level indicating element, the posts are substantially aligned with the direction of the substantially vertically downward movement of the support arms 12*a*. Thus, the post mounting portion 16*a* of mounting collar 16 is movable along the post 28 as the support arm 12*a* is moved vertically downward so that the mounting collar 16 does not bind during such downward movement after the vacuum cup of the respective vacuum cup assembly has engaged the object. The level indicating element thus allows for substantial alignment of the post in a generally vertical orientation to reduce or limit or substantially preclude binding or restricting of movement of the mounting collar along the post during the process of engaging the vacuum cups with the object surface. Such non-binding or reduced binding movement of the collar along the post results in reduced damage to the cup mounting assembly during use.

Although shown and described as being located at the upper surface of the support mounting portion 16*b* of the mounting collar 16, the level indicating device or element may be located elsewhere at the mounting assembly, while remaining within the spirit and scope of the present invention. For example, the level indicating element may be located at a side region of the mounting collar 16 or may be located at the post 28, or at the attachment element 48 or stop collar 54. The level indicating device or element thus may indicate the angle or degree of levelness of the level indicating device (or of the portion of the mounting assembly at which the level indicating device is located), and thus indicates the angle or degree of verticalness of the post 28. In applications where the level indicating device may be located at the post, the passageway defined by the post mounting portion of the mounting collar may not be substantially normal to the passageway defined by the arm mounting portion of the mounting collar. Desirably, the level indicating device is located at a location where it is readily viewable by an operator adjusting the mounting collar about the support arm and securing the mounting collar at the desired or appropriate orientation relative to the support arm.

Although shown and described as comprising a bubble indicator in fluid contained within the level indicating element, the level indicating element or device may comprise any suitable level indicating device, such as an electronic level indicating device or the like. Optionally, the level indicating device may provide an indication of an orientation other than level or horizontal, so that the mounting collar and post may be readily set to a desired angle or orientation. Such an indication may be provided by an electrical level indicator or by the indicating bubble being at different gradations or marks (which are selected as indicative of the desired angle with respect to a horizontal or level plane) at the indicating device. The support arms may be movable along the desired angle and substantially in alignment with the angled posts of the cup assemblies to reduce or limit or substantially preclude binding of the mounting collars at the respective posts during engagement of the cups with the object.

When at least some, if not all, of the vacuum cups have engaged the object and the vacuum source has substantially sealed the vacuum cups at the object surface (as may be detected by an object sensor at one or more of the material handling devices), the support assembly may raise the object and move or transport the object to the desired or targeted destination. When the object is generally at the targeted destination location or station, the material handling system may release the object or disengage the object from the vacuum cups. For example, the object may be stripped from the cups, or the vacuum source may be deactivated or the object may be otherwise detached from the vacuum cups to release the object at the destination, without affecting the scope of the present invention. After the object has been released or stripped or detached from the vacuum cups, the material handling system may move the material handling devices back to the stack of objects to pick up the next object.

Figure 5:
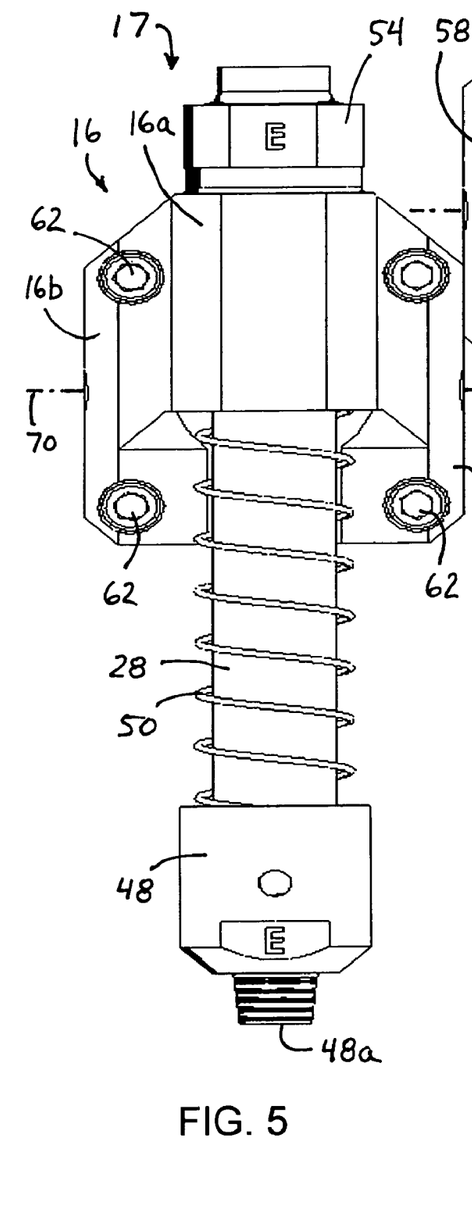
FIG. 5 is a side elevation of the material handling device of the present invention, with the mounting collar in a first orientation.
Figure 6:
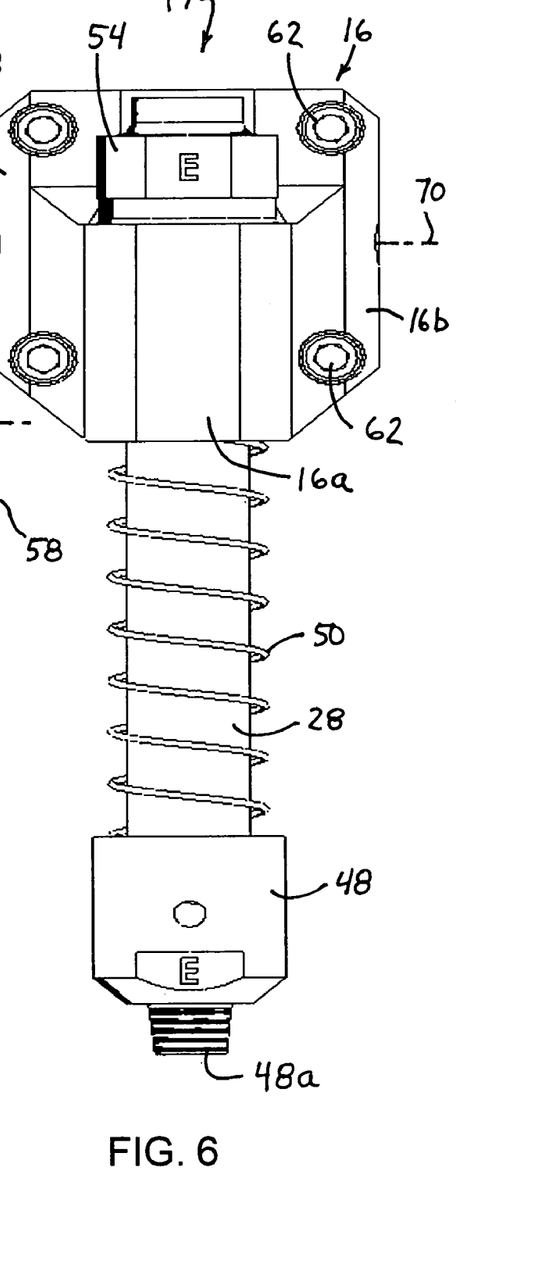
FIG. 6 is a side elevation of the material handling device of the present invention, with the mounting collar in a second orientation that is flipped or rotated generally 180 degrees relative to the first orientation of FIG. 5.

Optionally, and with reference to FIGS. 5 and 6, mounting collar 16 may be adjustably or reversibly mounted on post 28 so as to adjust a level of the post mounting portion 16*a* relative to the support arm 12*a* to which the mounting collar is mounted. For example, the mounting collar 16 may be removed from post 28 (such as via loosening and/or removal of collar 54 and sliding the mounting collar off of the post) and flipped 180 degrees and re-positioned onto the post 28 to reverse the orientation of the mounting collar relative to the post and the vacuum cup. Optionally, the mounting collar may comprise a unitary collar that is slidable off of or onto the post when the collar 54 is removed, or the mounting collar may comprise a two piece mounting collar and may be removed from the post via removal of fasteners or the like to facilitate flipping or turning of the mounting collar at the post without having to remove the collar at the end of the post, while remaining within the spirit and scope of the present invention. Such an adjustment and varying mounting collar configurations and arrangements may be selected and implemented for applications where the support arms of the support assembly are not at the same level, such as when used in connection with a branched support or tool. Alternately, such an adjustment may be suitable for applications where the support arms 12*a* are at the same level yet some of the vacuum cups may engage an object surface at a first level and others of the vacuum cups may engage the object surface at a second or other level. By adjusting the level or height or position of some of the cups relative to the respective support arm, the cups may be set so as to engage the object surface at approximately the same time as the mounting assembly is moved toward the object. For example, and with reference to FIGS. 5 and 6, when one of the clamps or collars is flipped or reversed relative to the other, the clamps or collars may mount to support arms at different levels, while the cups of the assemblies are at or near the same generally horizontal plane.

Figure 7:
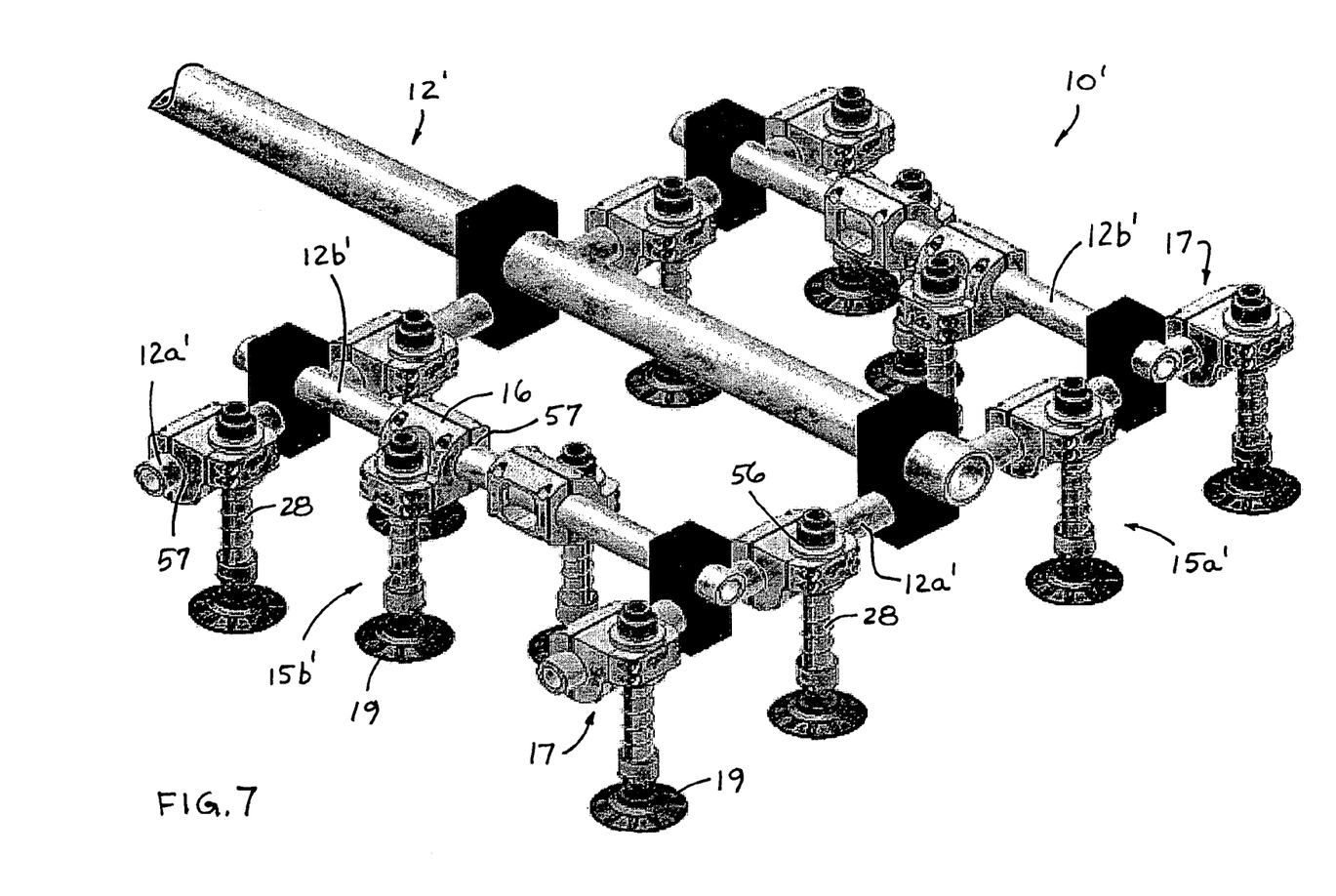
FIG. 7 is a perspective view of another material handling system in accordance with the present invention.
Figure 8:
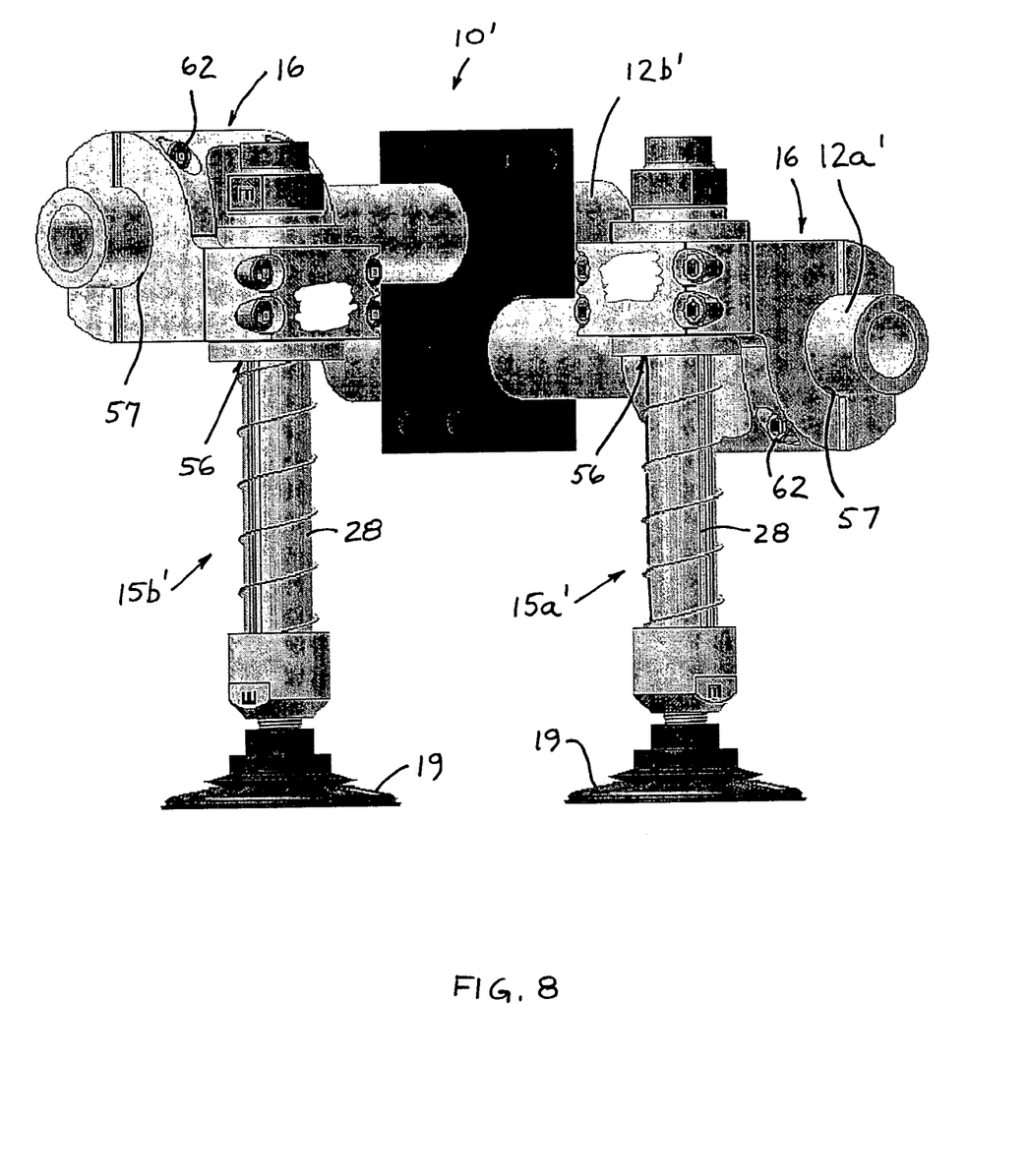
FIG. 8 is a side elevation of two of the vacuum cup assemblies of the material handling system of FIG. 7.
Figure 9:
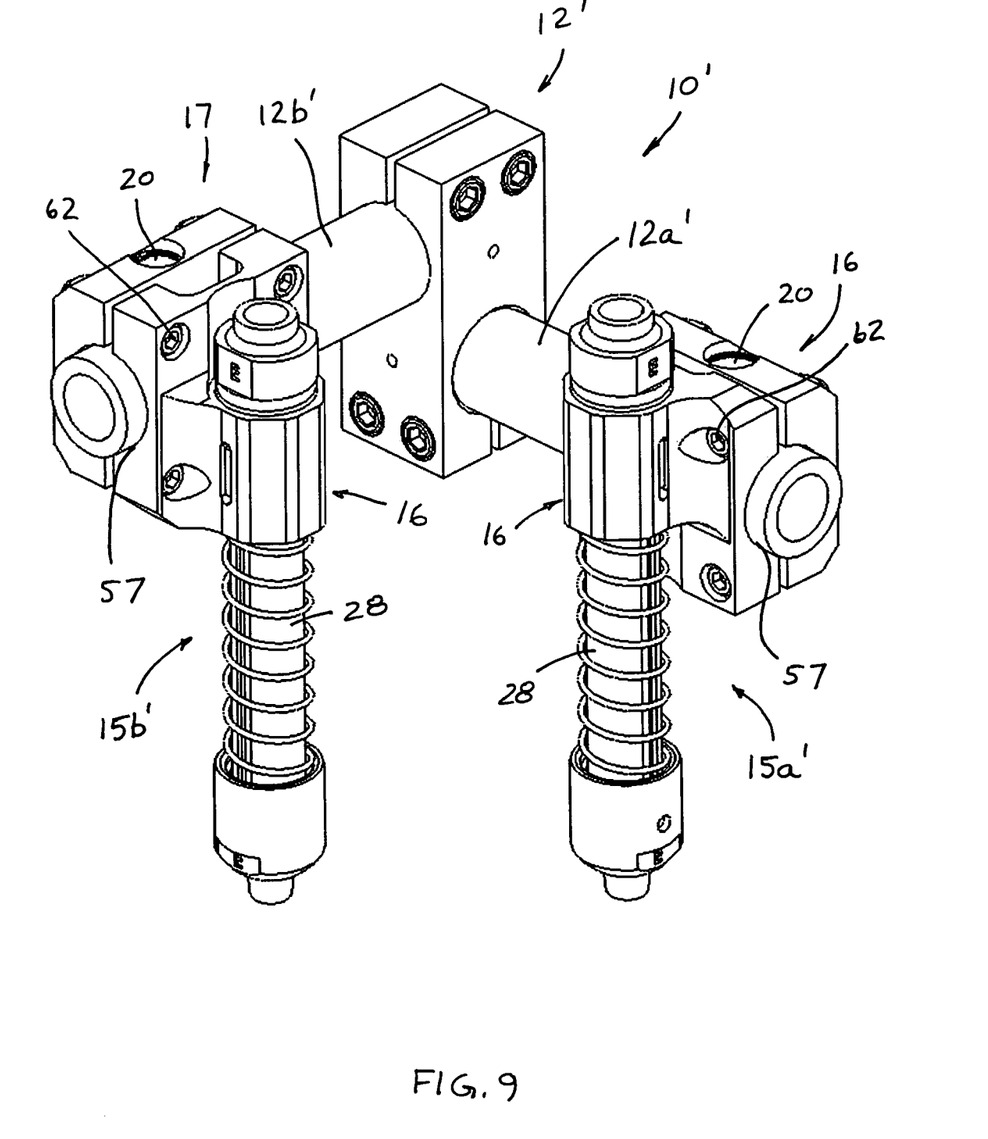
FIG. 9 is a perspective view of two of the vacuum cup assemblies of the material handling system of FIG. 7.

For example, and as can be seen in FIGS. 7-9, a material handling system 10' includes a support assembly 12' that is operable to move and support a plurality of vacuum cup assemblies or material handling devices or assemblies or destackers 15*a*', 15*b*' (although shown in FIGS. 7 and 8 as being similar to cup assemblies 15 of FIG. 1, the cup assemblies 15*a*', 15*b*' may be similar to cup assemblies 14 discussed above (and as shown in FIG. 9) while remaining within the spirit and scope of the present invention). Support assembly 12' is movable or adjustable or controllable to move the material handling devices 15a', 15b' into engagement with an object (not shown), where the vacuum cups 19 of material handling devices 15a', 15b' may engage and seal to the object for picking up and moving the object. The material handling devices 15a', 15b' include mounting assemblies or elements 17 that mount the cups to the support assembly 12' and that may include a level indicating device or element established thereon and integral therewith, such as described above. Mounting assemblies 17 includes a mounting collar 16, which is adjustably mounted to the support assembly 12' and is adjustable to set or establish the orientation of the material handling devices 15a', 15b' relative to the support assembly, such as in a similar manner as described above. Cup assemblies 15a', 15b' may be substantially similar to cup assembly 14 or 15 discussed above, such that a detailed discussion of the cup assemblies need not be repeated herein. Although the cup assemblies illustrated in FIGS. 7 and 8 are different constructions than the cup assemblies of FIGS. 1-6 and 9, the cup assemblies function in substantially similar manners and the differences are not significant for the purposes of the discussions herein.

In the illustrated embodiment, support assembly 12' includes a support arm 12a' and a support arm 12b', with the support arms 12a', 12b' being generally perpendicular to one another and with support arm 12b' being above support arm 12a'. Thus, the level or height of the support arms 12a' is vertically offset from the level or height of support arms 12b'. For example, a vacuum cup assembly 15a' may be mounted to support arm 12a', with the mounting collar 16 set to a first orientation, whereby the longitudinal axis of the passageway 57 that receives support arm 12a' is at a first distance from the vacuum cup perimeter seal when the mounting collar is at an upper end of the post. Similarly, a vacuum cup assembly 15b' may be mounted to support arm 12b', with the mounting collar 16 set to a second orientation, whereby the longitudinal axis of the passageway 57 that receives the support arm 12b' is at a second distance from the vacuum cup perimeter seal when the mounting collar is at the upper end of the post.

As can be seen in FIG. 8, when the vacuum cup assemblies 15a', 15b' are mounted to the vertically offset support arms 12a', 12b', respectively, the vacuum cup perimeter seals are at substantially the same level for engaging a substantially level object surface. This is because the distance between the longitudinal axis of passageway 57 when in the different orientations (i.e. when the mounting collar is "right side up" versus when it is "upside down") is selected to be substantially the same as the distance between the vertically offset support arms. As can be seen with reference to FIGS. 5-9, the passageway 56 of the post mounting portion of the mounting collar is offset from the center of the mounting collar such that the post mounting portion receives the post at an upper portion of the mounting collar when in a first orientation and the post mounting portion receives the post at a lower portion of the mounting collar when in a second orientation. Thus, when the mounting collar is flipped or reversed by 180 degrees about a horizontal pivot axis (that is generally normal to post receiving passageway 56 and is generally through a center region of the mounting collar), the level of the support arm passageway 57 is adjusted to accommodate the level or change in level of the support arm relative to the other support arm.

Such an adjustable arrangement of vacuum cup assemblies is accomplished via the vacuum cup assemblies of the present invention with common mounting collars and mounting assemblies, such that separate vacuum cup assemblies and/or mounting assemblies are not needed for the different height support arms. The mounting collars for some of the vacuum cup assemblies are simply flipped or reversed and then mounted to the support arm or arms that is/are vertically offset from the support arm or arms to which the vacuum cup assemblies with the "unflipped" mounting collars are attached. Thus, the initial positions of the vacuum cups (the position where the mounting collars are at the upper end of the respective post and before the cups are engaged with an object) are substantially at the same level such that the support arms move the vacuum cups toward and into engagement with the object surface and such that the support arms engage the object surface at substantially the same time due to their initial location at about the same horizontal plane.

Thus, some of the vacuum cup assemblies may be mounted to lower support arms with the mounting collar orientation shown in FIG. 5 (with the longitudinal axis 70 of the support arm being at a lower level relative to the vacuum cup), while others of the vacuum cup assemblies may be mounted to upper support arms with the mounting collar orientation shown in FIG. 6 (with the longitudinal axis 70 of the support arm being at a higher level relative to the vacuum cup). Accordingly, as the vacuum cup assemblies are moved downward toward the object, the vacuum cups may be at substantially the same plane (as can be seen in FIG. 8) and thus may engage the object surface at approximately the same time. Optionally, in applications where the vacuum cup assemblies are mounted to support arms at the same level, some of the assemblies with the collar orientation of FIG. 6 may contact a lower portion or surface of the object, while the vacuum cups of the assemblies with the collar orientation of FIG. 5 may contact a raised portion or surface of the object.

Therefore, the material handling system of the present invention moves one or more material handling devices and vacuum cups and/or suction cups into engagement with an object with reduced binding of the mounting collars at and along the support posts. The level indicating device or element may be integral with or embedded in a portion of the cup mounting assembly and provides an indication when the mounting element or collar is substantially level and/or when the post is substantially vertically oriented. Thus, an operator or user can readily orient the post and mounting device substantially vertically to reduce or limit damage to the mounting assembly during use. The support arm is movable generally vertically and thus substantially along the longitudinal axis of the post so that reduced binding of the mounting collar at the post may occur. The present invention thus provides an enhanced means for setting the mounting collar and post at the desired or appropriate orientation for enhanced or optimal movement of the support arms during engagement of the cups with the object.

Changes and modifications to the specifically described embodiments may be carried out without departing from the principles of the present invention, which is intended to be limited only by the scope of the appended claims as interpreted according to the principles of patent law.

The embodiments of the invention in which an exclusive property is claimed are defined as follows:

1. A material handling system for moving an object, said material handling system comprising:
    support assembly having at least one support arm;
    at least one cup assembly comprising a cup and a mounting assembly, said cup having a perimeter seal for engaging and substantially sealing at an object;
    said mounting assembly comprising a post extending from said cup and a mounting collar movably attached to said post;

said mounting collar being adjustably attached to said at least one support arm of said support assembly, said mounting collar being attached to said at least one support arm such that movement of said support assembly moves said cup toward and into engagement with the object, said mounting collar being movable along said post when said cup is engaged with the object and said support arm moves further toward the object;

said mounting assembly comprising a level indicating element for indicating an orientation of said mounting assembly; and wherein said mounting collar is adjustable relative to said support arm to establish a level orientation of said mounting assembly, said level indicating element providing an indication when said mounting assembly is generally at said level orientation, said mounting collar being securable relative to said at least one support arm when said mounting assembly is in said level orientation.

2. The material handling system of claim 1, wherein said level indicating device provides an indication that said post is in a substantially vertical orientation.

3. The material handling system of claim 1, wherein said level indicating element is positioned at said mounting collar and provides an indication that said mounting collar is at a substantially horizontal orientation.

4. The material handling system of claim 3, wherein said post is substantially normal to said support arm when said mounting collar is mounted to said support arm, said level indicating element providing an indication that said post is in a substantially vertical orientation.

5. The material handling system of claim 1, wherein said level indicating element is recessed within a surface of said mounting collar.

6. The material handling system of claim 1, wherein said mounting collar comprises a post mounting portion that receives said post through an aperture thereof and a support arm mounting portion that receives said support arm through an aperture thereof, said support arm mounting portion being securable at said support arm.

7. The material handling system of claim 6, wherein said movable support arm comprises a generally cylindrical support rod and said mounting collar receives said movable support rod through a rod receiving portion of said mounting collar, said mounting collar being adjusted relative to said support rod via pivoting said rod receiving portion and said mounting collar about a longitudinal axis of said support rod to adjust said mounting collar and said vacuum cup relative to said support rod, said rod receiving portion being selectively securable to limit movement of said mounting collar relative to said support rod.

8. The material handling system of claim 6, wherein said mounting collar is adjustable to rotate said support arm mounting portion approximately 180 degrees about a generally horizontal pivot axis that is generally transverse to a longitudinal axis of said support arm, whereby rotation of said support arm mounting portion adjusts an initial distance between said support arm receiving portion and said cup.

9. The material handling system of claim 8, wherein said at least one support arm comprises a first support arm at a first level and a second support arm at a second level above said first level, said at least one cup assembly comprising a first cup assembly mounted to said first support arm and a second cup assembly mounted to said second support arm, said mounting collar of said first cup assembly being at a first orientation and said mounting collar of said second cup assembly being at a second orientation wherein mounting collar of said second cup assembly is rotated approximately 180 degrees about said generally horizontal pivot axis relative to said mounting collar of said first cup assembly, whereby said cups of said first cup assembly and said second cup assembly are at substantially the same level when said mounting collars are at an upper end of said post of said respective one of said first and second cup assemblies.

10. The material handling system of claim 1, wherein said post includes a biasing member to urge said mounting collar away from said cup.

11. The material handling system of claim 1 including an object sensing device positioned at least partially through said cup.

12. The material handling system of claim 1, wherein said cup is attached to a swivel member and said post is attached to and extends from a receiving collar, said swivel member being pivotally received in said receiving collar.

13. The material handling system of claim 1, wherein said level indicating element comprises a fluid level indicating element.

14. A material handling system for moving an object, said material handling system comprising:

a support assembly having a first support arm at a first level and a second support arm at a second level, said second level being above said first level;

a first cup assembly mounted to said first support arm and a second cup assembly mounted to said second support arm, said first and second cup assemblies each comprising a cup and a mounting assembly, said cup having a perimeter seal for engaging and substantially sealing at an object, said mounting assembly comprising a post extending from said cup and a mounting collar movably attached to said post;

said mounting collar of said first cup assembly being set at a first orientation and said mounting collar of said second cup assembly being set at a second orientation wherein said mounting collar of said second cup assembly is rotated approximately 180 degrees about a generally horizontal pivot axis relative to said mounting collar of said first cup assembly;

said mounting collar of said first cup assembly being attached to said first support arm and said mounting collar of said second cup assembly being attached to said second support arm, said vacuum cups of said first and second cup assemblies being at substantially the same level when said first and second cup assemblies are mounted to said first and second support arms, respectively; and wherein said mounting collars are attached to said first and second support arms such that movement of said support assembly moves said cups of said first and second cup assemblies toward and into engagement with the object.

15. The material handling system of claim 14, wherein said mounting assembly of said first cup assembly comprises a level indicating element for indicating an orientation of said mounting assembly, said mounting collar of said first cup assembly being adjustable relative to said first support arm to establish a level orientation of said mounting assembly, said level indicating element providing an indication when said mounting assembly of said first cup assembly is generally at said level orientation, said mounting collar being securable relative to said first support arm when said mounting assembly is in said level orientation.

16. The material handling system of claim 15, wherein said level indicating device provides an indication that said post of said first cup assembly is in a substantially vertical orientation.

17. The material handling system of claim 15, wherein said level indicating element is positioned at said mounting collar and provides an indication that said mounting collar is at a substantially horizontal orientation.

18. The material handling system of claim 15, wherein said level indicating element is recessed within a surface of said mounting collar.

19. The material handling system of claim 14, wherein said mounting collars are movable along said posts when said cups are engaged with the object and said support arms move further toward the object.

* * * * *